United States Patent
Sutphen et al.

(10) Patent No.: US 9,862,625 B1
(45) Date of Patent: Jan. 9, 2018

(54) SYSTEM AND METHOD FOR TREATING WASTEWATER ENTERING A SEPTIC TANK

(71) Applicants: Paul H. Sutphen, Branchville, NJ (US); William E. Dermody, IV, Sparta, NJ (US); Lauren Sutphen Dermody, Sparta, NJ (US)

(72) Inventors: Paul H. Sutphen, Branchville, NJ (US); William E. Dermody, IV, Sparta, NJ (US); Lauren Sutphen Dermody, Sparta, NJ (US)

(*) Notice: Subject to any disclaimer, the term of this patent is extended or adjusted under 35 U.S.C. 154(b) by 812 days.

(21) Appl. No.: 14/027,328

(22) Filed: Sep. 16, 2013

(51) Int. Cl.
| | |
|---|---|
| *B01D 21/01* | (2006.01) |
| *C02F 1/52* | (2006.01) |
| *B03D 3/00* | (2006.01) |
| *C02F 1/68* | (2006.01) |
| *B01D 21/30* | (2006.01) |
| *C02F 1/00* | (2006.01) |
| *B01D 21/00* | (2006.01) |
| *B01D 21/24* | (2006.01) |
| *C02F 103/00* | (2006.01) |
| *C02F 101/10* | (2006.01) |
| *B01D 21/02* | (2006.01) |

(52) U.S. Cl.
CPC ............ *C02F 1/5245* (2013.01); *B01D 21/01* (2013.01); *B01D 21/30* (2013.01); *C02F 1/52* (2013.01); *C02F 1/5209* (2013.01); *C02F 1/5281* (2013.01); *B01D 21/02* (2013.01); *C02F 1/006* (2013.01); *C02F 1/686* (2013.01); *C02F 2001/007* (2013.01); *C02F 2101/105* (2013.01); *C02F 2103/005* (2013.01); *C02F 2209/40* (2013.01)

(58) Field of Classification Search
USPC ....... 210/702, 709, 716, 717, 723, 738, 739, 210/744, 747.1, 747.7, 749, 753, 754, 210/767, 85, 87, 96.1, 97, 101–103, 210/170.01, 170.08, 172.1, 172.2, 198.1, 210/199, 205–207, 513, 532.1, 532.2, 906
See application file for complete search history.

(56) References Cited

U.S. PATENT DOCUMENTS

| | | | | |
|---|---|---|---|---|
| 3,247,106 | A * | 4/1966 | Sopoci ................ | B01D 21/01 210/193 |
| 4,081,365 | A * | 3/1978 | White ................. | C02F 3/1215 210/626 |
| 7,300,583 | B1 * | 11/2007 | Heppenstall .......... | C02F 1/686 210/205 |

(Continued)

*Primary Examiner* — Clare M Perrin
(74) *Attorney, Agent, or Firm* — Lamorte & Associates

(57) ABSTRACT

A water conditioning system for use in a building that produces wastewater that contains phosphates. The wastewater exits the building through a pipe that directs the wastewater directly to a septic tank. A phosphate precipitation solution is provided in a reservoir. A flow meter is installed that measures fresh water flowing into the building. Furthermore, an injection port is installed into the pipe before the septic tank. The phosphate precipitation solution is pumped into the pipe through the injection port at a rate that is controlled by the flow being measured by the flow meter. The phosphate precipitation solution mixes with the wastewater to create treated effluent. The treated effluent flows into the septic tank where the phosphates form salts and collect as solids.

9 Claims, 1 Drawing Sheet

(56) References Cited

U.S. PATENT DOCUMENTS

2004/0124138 A1* 7/2004 Veilleux .................. C02F 3/006
                                                        210/614
2011/0006013 A1* 1/2011 Nichols .................. B01D 21/01
                                                        210/727

* cited by examiner

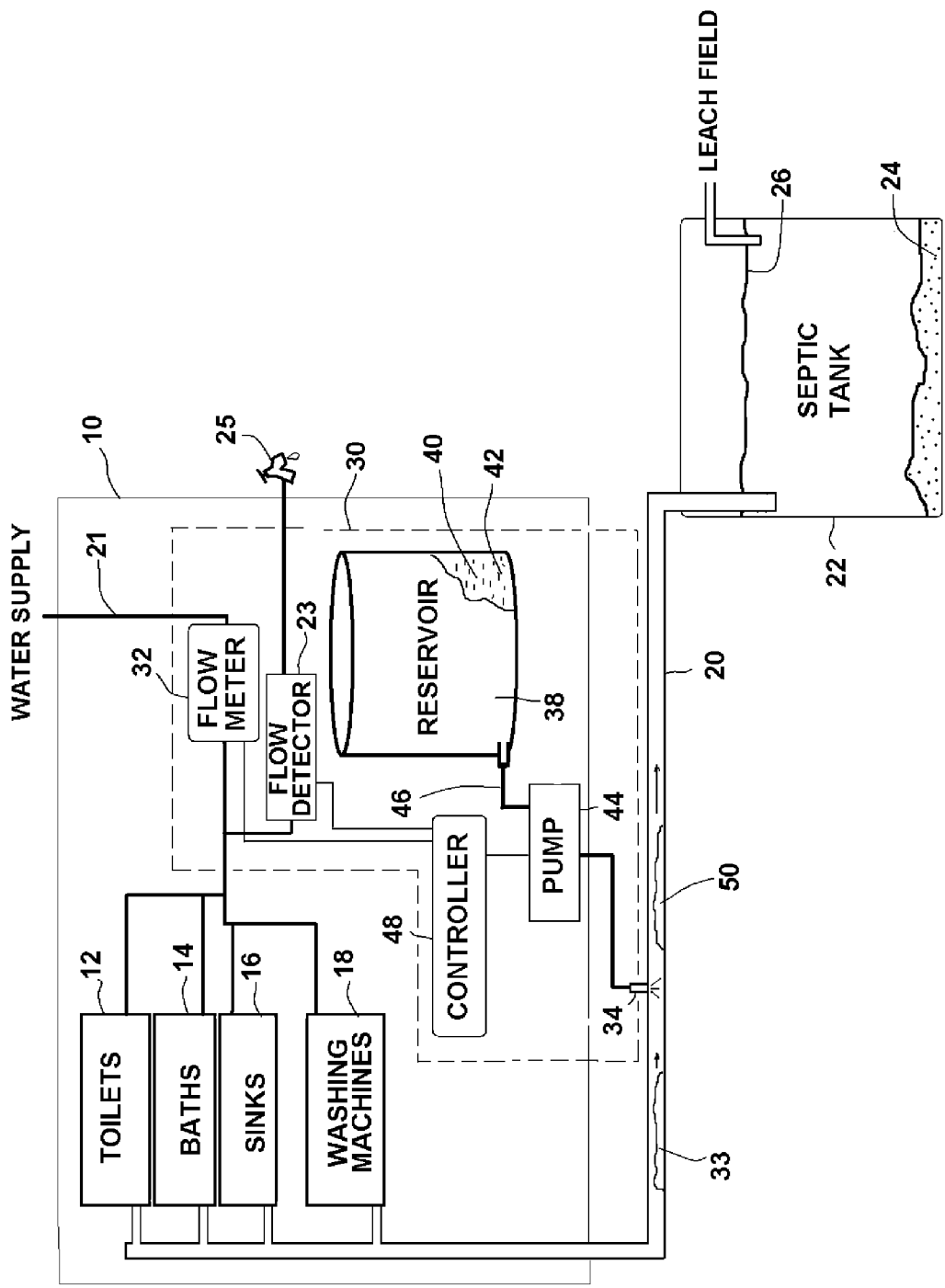

SYSTEM AND METHOD FOR TREATING WASTEWATER ENTERING A SEPTIC TANK

BACKGROUND OF THE INVENTION

1. Field of the Invention

In general, the present invention relates to systems and methods for removing phosphates from wastewater by reacting the wastewater with hydrated aluminum sulphate. The present invention also relates to private water treatment systems that are utilized by residents having septic tanks.

2. Prior Art Description

Phosphorus is an essential element for plant life, but when there is too much of it in water, it can produce eutrophication. Eutrophication is a reduction in dissolved oxygen in water bodies caused by an increase of mineral and organic nutrients. Once a body of water becomes eutrophic, it is enriched with minerals. This causes algae to grow in the water at an accelerated rate. These algae blooms, in term, deplete the water of oxygen and can release toxins into the water. This makes the water unable to sustain wildlife. It also makes the water unfit to drink without expensive and complicated treatment systems.

Some of the largest sources of phosphate contamination come from wastewater. Phosphates are present in organic waste. Phosphates are also present in many detergents used in the home. Thus, phosphates flow into the drains of many homes. If a home is connected to a municipal sewer system, then the wastewater from that home flows to a wastewater treatment plant. In the wastewater treatment plant, many of the phosphates can be removed before the water is released back into the environment. Phosphates are removed from wastewater by reacting the phosphates with other chemicals, such as calcium, iron, or aluminum, in order to create phosphate salts. The phosphate salts then precipitate out of the water and are collected and removed as sludge. An example of a phosphate precipitation reaction using hydrated aluminum sulphate is shown below:

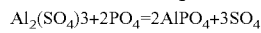
$$Al_2(SO_4)3 + 2PO_4 = 2AlPO_4 + 3SO_4$$

The reaction creates aluminum phosphates ($AlPO_4$), which collects at the bottom of a treatment plant as sludge.

Although municipal water treatment plants greatly reduce the amount of phosphates from wastewater released into the environment, not all homes are connected to municipal sewer systems. Rather, in many suburban and rural areas, homes are connected to septic systems. If a home has a septic system, the wastewater of the home leaches into the ground around the home. The wastewater contains phosphates. The phosphates flow into ground water and percolate into surface water. Once in the surface water, the eutrophic water can bloom with algae and contaminate downstream water sources.

Controlling phosphorous discharge from wastewater is a key factor in preventing eutrophication of surface water. However, most home septic systems leach untreated wastewater directly into the surrounding environment. A need therefore exists for a system and method that can reduce the amount of phosphates in the waste collected by a septic system before that wastewater has an opportunity to leach into the surrounding environment. This need is met by the present invention as described and claimed below.

SUMMARY OF THE INVENTION

The present invention is a water conditioning system for use in a building that produces wastewater that contains phosphates. The building has a private septic system with a septic tank. The wastewater exits the building through a pipe that directs the wastewater directly to the septic tank.

A volume of a phosphate precipitation solution is provided in a reservoir. The reservoir is preferably a tank stored in the building producing the wastewater. The phosphate precipitation solution can be many compounds, but is preferably a solution of hydrated aluminum sulphate.

A flow meter is installed onto the water supply line of the building. The flow meter measures water flow into the building, which correlates to the volume of wastewater flowing out of the building. An injection port is installed into the pipe that leads to the septic tank. The phosphate precipitation solution is pumped into the pipe through the injection port at a rate that is controlled by the incoming water flow being measured by the flow meter. The phosphate precipitation solution mixes with the wastewater within the pipe to create treated effluent. The treated effluent flows into the septic tank where the phosphates form salts and collect as solids at the bottom of the septic tank.

BRIEF DESCRIPTION OF THE DRAWINGS

For a better understanding of the present invention, reference is made to the following description of an exemplary embodiment thereof, considered in conjunction with the accompanying drawings, in which:

FIG. 1 is a schematic showing the primary components contained in the present invention water conditioning system.

DETAILED DESCRIPTION OF THE DRAWINGS

Although the present invention wastewater conditioning system can be embodied in many ways, the embodiment illustrated shows the system being used to condition wastewater from a residential home that has a simple septic system with a buried septic tank. This embodiment is selected in order to set forth one of the best modes contemplated for the invention. The illustrated embodiment, however, is merely exemplary and should not be considered a limitation when interpreting the scope of the appended claims.

Referring to FIG. 1, it will be understood that a residential home produces wastewater from a variety of sources. Within the building 10 are wastewater sources, such as toilets 12, baths 14, sinks 16, and a variety of washing machines 18, such as clothes washing machine and dish washing machines. The outputs of all these wastewater sources typically flow into a main septic effluent pipe 20 in the basement of the building 10. The septic effluent pipe 20 flows directly into a septic tank 22. Within the septic tank 22, solids settle to the bottom as sludge 24. The surplus liquid 26 is directed into a leach field, where it is absorbed by the environment. The sludge 24 at the bottom of the septic tank 22 remains until the septic tank 22 is pumped out and cleaned. This is typically done every one to three years depending upon the size of the septic tank 22 and usage. However, the liquid flows into the leach field as soon as it reaches a leach field port.

In the wastewater flowing into the septic tank 22, the concentrations of phosphorous for a household typically ranges from 10 milligrams per liter to 18 milligrams per liter. An individual's phosphorous production typically ranges between 2.3 grams per day to 2.7 grams per day. The water consumption per individual that is supplied to the septic tank 22 in the form of wastewater typically ranges between 150 liters per day and 300 liters per day.

The present invention water conditioning system 30 is a unit that is designed to be quickly and inexpensively installed within the home. The water conditioning system 30 requires access to both the incoming water supply line 21 and the outgoing septic effluent pipe 20. The typical installation location is in the basement of the building 10 where in incoming water supply line 21 and the outgoing septic effluent pipe 20 are exposed.

To install the water conditioning system 30, a hole is drilled and tapped into the septic effluent pipe 20. An injection port 34 is installed into the tapped hole. This enables material to be added into the wastewater 33 that flows through the septic effluent pipe 20 before that wastewater reaches the septic tank 22.

A flow meter 32 is installed onto the water supply line 21. The flow meter 32 can be installed at any point along the water supply line 21 prior to reaching septic supply sources, such as toilets 12, baths 14, sinks 16 and washing machines 18. The flow meter 32 need not be installed before water supply points 25, such as outdoor hose connections, that do not drain into the septic tank 22. If the flow meter 32 cannot be installed after any drain free water supply point 25, then secondary flow detectors 23 can be installed along the lines that lead to the drain free water supply points 25, such as outdoor hose connections 25.

The water conditioning system 30 includes a reservoir 38 that holds a phosphate precipitation solution 40, such as a lime solution, a ferric chloride solution, or a hydrated aluminum sulphate solution. In the preferred embodiment, the reservoir 38 has a volume of at least one hundred liters. However, larger and smaller reservoirs could certainly be used. For a variety of reasons, including cost and chemical properties, the preferred phosphate precipitation solution 40 is hydrated aluminum sulphate 42.

The hydrated aluminum sulphate solution 42 contained within the reservoir 38 is preferably comprised of one part hydrated aluminum sulphate to three parts water. This ratio prevents supersaturation of the solution down to temperatures as low as twenty-five degrees Fahrenheit.

The water conditioning system 30 also contains a pump 44 that pumps the hydrated aluminum sulphate solution 42 into the septic effluent pipe 20. The intake of the pump 44 is coupled to the reservoir 38 using an appropriate length of tubing 46. The output of the pump 44 can be directly connected to the injection port 34. The pump 44 is preferably a peristaltic pump that is capable of pumping precise volumes of the hydrated aluminum sulphate solution 42. However, other pumps can also be used.

The water meter 32 detects the flow of water into systems that drain into the septic tank 22. It will be understood that the flow of water detected by the flow meter 32 is proportional to the flow of wastewater 33 flowing into the septic tank 22. The operation of the pump 44 is controlled by an electronic controller 48. The electronic controller 48 is preprogrammed to maintain a consistent concentration of the hydrated aluminum sulphate within the wastewater 33 that is flowing toward the septic tank 22. The electronic controller 48 monitors the flow of wastewater 33 flowing into the septic effluent pipe 20 by monitoring the incoming flow of water with the flow meter 32.

In operation, the flow meter 32 monitors the flow of incoming water flowing through the water supply line 21. By monitoring the flow of incoming water, the volume of wastewater 33 can be accurately predicted. The electronic controller 48 reads the flow detected by the flow meter 32. The electronic controller 48 then operates the pump 44 to inject precise amounts of the hydrated aluminum sulphate solution 42 into the septic effluent pipe 20 so that the hydrated aluminum sulphate solution 42 can mix with the passing wastewater 33. The mixing of the hydrated aluminum sulphate solution 42 with the wastewater 33 in the septic effluent pipe 22 creates treated effluent 50. The treated effluent 50 then flows into the septic tank 22.

If the water flow detected by the flow meter 32 is directed to a drain free water supply point 25, then the electronic controller 48 ignores the signal from the flow detector 23 and does not operate the pump 44. This prevents the hydrated aluminum sulphate solution 42 from being wasted if a person is washing a car or otherwise using water that will not flow into the septic tank 22.

If it is determined that the water being measured by the flow meter 32 is going to drain into the septic tank 22, then the hydrated aluminum sulphate solution 42 is pumped into the septic effluent pipe 20 at a rate that maintains a concentration of approximately 312 milligrams per liter of hydrated aluminum sulphate in the treated effluent 50. However, this initial target concentration can be changed to the needs of a specific septic system. Wastewater from the septic tank 22 can be tested. If the phosphate levels are high, then the concentration of hydrated aluminum sulphate can be increased. Likewise, the concentrations can be decreased if the phosphate levels are particularly low.

The pump rate of the hydrated aluminum sulphate solution 42 is dependent upon the flow rate of water in the water supply line 21. The total hydrated aluminum sulphate used in a day will be the amount of hydrated aluminum sulphate per gallon times the daily water consumed. As an example, if a residence produces fifty gallons of wastewater 33 in a day, then the total usage of hydrated aluminum sulphate would be 59400 milligrams (312 mg. per liter×50 Gal.×3.8 liters per gallon). The required feed rate of hydrated aluminum sulphate per gallon of water would be 59,400 milligrams of hydrated aluminum sulphate per fifty gallons, which is 1188 milligrams. Since the preferred solution concentration in the reservoir 38 is 288 milligrams of hydrated aluminum sulphate per milliliter, the dosage or pump rate would calculate to be approximately 4.1 milliliters of hydrated aluminum sulphate per gallon of water.

Since the treated effluent 50 contains the proper amount of hydrated aluminum sulphate before it reaches the septic tank 22, the level of treatment chemicals within the septic tank 22 is always ideal. Furthermore, the water conditioning system 30 is fully contained within the building 10 and does not require that any unsightly equipment be staged outside near the septic tank 22. No modifications to the existing septic tank 22 and leaching fields are required.

The treated effluent 50 results in the removal of up to 99% of the phosphates in the septic tank 22. Furthermore, fecal coliform leaving the septic tank 22 is reduced by up to 95%. As such, the septic system works better and lasts longer.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. In a building that produces wastewater that contains phosphates, wherein fresh water enters said building through a water supply line and wastewater exits said building through a pipe that directs said wastewater to a septic tank, a method of conditioning said wastewater, comprising the steps of:

storing a volume of a phosphate precipitation solution in a reservoir wherein said phosphate precipitation solution is a solution of hydrated aluminum sulfate and water that contains no less than twenty five percent hydrated aluminum sulfate by volume;

installing a flow meter to measure incoming water flow through said water supply line;

installing an injection port into said pipe;

pumping said phosphate precipitation solution into said pipe through said injection port at a rate that produces approximately 312 milligrams of hydrated aluminum sulfate per liter of said incoming water flow measured by said flow meter, wherein said phosphate precipitation solution mixes with said wastewater within said pipe to create treated effluent, wherein said treated effluent flows into said septic tank.

2. The method according to claim 1, further including providing a controller within said building that reads said incoming water flow measured by said flow meter and controls a pump as a function of said incoming water flow.

3. The method according to claim 1, wherein said step of storing a volume of a phosphate precipitation solution in a reservoir includes installing a reservoir tank in said building.

4. The method according to claim 3, wherein said reservoir tank has a volume of at least one hundred liters.

5. The method according to claim 3, further including attaching said reservoir tank to said pump with a tube.

6. The method according to claim 1, wherein said step of pumping includes utilizing a peristaltic pump.

7. A method of conditioning wastewater that is flowing out of a building and into a septic tank through a pipe, said method comprising the steps of:

measuring a flow of fresh water into said building through a water supply line utilizing a flow meter;

installing an injection port that leads into said pipe;

providing a hydrated aluminum sulfate solution that contains hydrated aluminum sulfate and water in a solution that contains no less than twenty five percent hydrated aluminum sulfate by volume;

providing a pump, wherein said pump pumps approximately 312 milligrams of said hydrated aluminum sulfate solution into said pipe per liter of said flow of fresh water measured by said flow meter;

pumping hydrated aluminum sulfate solution through said injection port, wherein said hydrated aluminum sulfate solution mixes with said wastewater within said pipe to create treated effluent, and wherein said treated effluent flows into said septic tank.

8. The method according to claim 7, further including providing a controller that reads said flow measured by said flow meter and controls said pump as a function of said flow.

9. The method according to claim 7, further including storing said hydrated aluminum sulfate solution in a reservoir tank, wherein said reservoir tank is connected to said pump with tubing.

\* \* \* \* \*